United States Patent [19]
Saillant

[11] Patent Number: 5,953,995
[45] Date of Patent: Sep. 21, 1999

[54] SYSTEM FOR TRANSPORT BY PASSIVE VEHICLES

[75] Inventor: Yves C. D. Saillant, Champfleury, France

[73] Assignees: Marc Treviso; Jean-Claude Mourer, both of Reims, France

[21] Appl. No.: 08/732,370

[22] PCT Filed: Apr. 27, 1995

[86] PCT No.: PCT/FR95/00554

§ 371 Date: Jan. 21, 1997

§ 102(e) Date: Jan. 21, 1997

[87] PCT Pub. No.: WO95/29834

PCT Pub. Date: Nov. 9, 1995

[30] Foreign Application Priority Data

Apr. 29, 1994 [FR] France ................................. 94 05273

[51] Int. Cl.⁶ .................................................. B61B 13/12
[52] U.S. Cl. .................... 104/88.3; 104/139; 104/166; 104/298; 246/182 R; 246/187 A; 701/20
[58] Field of Search ................... 104/88.3, 139, 104/166, 298; 246/3, 27, 28 R, 167 R, 182 R, 187 A; 364/426.05; 701/19, 20

[56] References Cited

U.S. PATENT DOCUMENTS

| 3,077,165 | 2/1963 | Pirelli | 104/247 |
|---|---|---|---|
| 3,356,040 | 12/1967 | Fabrites . | |
| 4,593,623 | 6/1986 | Gutekunst et al. | 104/166 |
| 4,766,547 | 8/1988 | Modery et al. | 104/88.3 |
| 4,825,135 | 4/1989 | Perez | 104/166 |
| 4,909,153 | 3/1990 | Lacroix et al. | 104/166 |
| 4,922,831 | 5/1990 | Ziegenfus et al. | 104/166 |

FOREIGN PATENT DOCUMENTS

| 2036543 | 12/1970 | France . |
|---|---|---|
| 2126797 | 10/1972 | France . |
| 2599694 | 12/1987 | France . |
| 2690120 | 4/1992 | France . |
| 1095414 | 12/1967 | United Kingdom . |

*Primary Examiner*—S. Joseph Morano
*Attorney, Agent, or Firm*—Leydig, Voit & Mayer

[57] ABSTRACT

A transport system for passive vehicles which move by way of wheels on treadways of a track includes guide surfaces for guiding the vehicles along the track. Each vehicle includes at least one drive roller propelling the vehicle through contact with rotary tubes. An axis of the drive roller is steerable with respect to the axis of the tubes. The vehicle also includes guide rollers adapted to cooperate with guide surfaces of the track. The track includes a trench containing the rotary tubes and a cover disposed atop the trench and having a lengthwise slit.

13 Claims, 3 Drawing Sheets

SYSTEM FOR TRANSPORT BY PASSIVE VEHICLES

BACKGROUND OF THE INVENTION

The invention relates to a system for the transport by passive vehicles of the type in which the vehicles are moving with the assistance of wheels onto treadways of a track. As a way of ensuring the displacement of the vehicles, a series of rotary tubes are arranged without any discontinuity in the longitudinal direction of the track, and means for guiding the vehicles along the latter we provided, Each vehicle comprises at least two bogies carrying displacement wheels, at least one drive roller for propelling the vehicle through frictional contact with the outer peripheral surface of the rotary tubes and the axis of rotation of which is steerable with respect to the axis of the tubes through pivoting about a substantially vertical axis between a position parallel to the tubes in which the rollers do not propel the vehicle and a position of maximum propulsion, and a device for guiding the vehicle adapted to co-operate with the guide means of the track.

The transport systems of this kind, which are known, exhibit the major inconvenience of requiring a relatively complex and expensive infrastructure and equipment on the vehicles intended to co-operate with this infrastructure with a corresponding complexity.

These systems in view of their excessive costs of installation and operation are not competitive with respect to other known transport systems, such as tramways. Thus the advantage of much better compatibility with the environment than the known systems are brought into disrepute by the above-mentioned economical inconveniences.

SUMMARY OF THE INVENTION

The present invention has as its object to propose a transport system of the type stated hereinabove which exhibits an even lower cost of installation and operation than the other competing transport systems while further increasing its environmental or ecological advantage.

To reach that goal, the transport system according to the invention is characterized in that the guide means of the track are formed of two parallel surfaces advantageously extending symmetrically with respect to the vertical middle plane of the track along the latter and in that the device for guiding each vehicle comprises wheels mounted onto a support made fast to the bogies so as to bear upon the guide surfaces.

According to one characteristic of the invention, the device for steering the propelling drive rollers is formed of an electric step motor.

According to another characteristic of the invention the transport system comprises a central control station adapted to dialogue with an emitter/receiver device on board each vehicle and the track is divided into sectors to each one of which is assigned a set speed in accordance with the topography of the track sector and if need be with the location with respect to the foregoing vehicles.

BRIEF DESCRIPTION OF THE DRAWINGS

The invention would be better understood and further objects, characteristics, details and advantages thereof will appear more clearly in the explanatory description which will follow, made with reference to the attached diagrammatic drawings given by way of example only illustrating an embodiment of the invention and in which.

DESCRIPTION OF PREFERRED EMBODIMENTS

Figure 1:
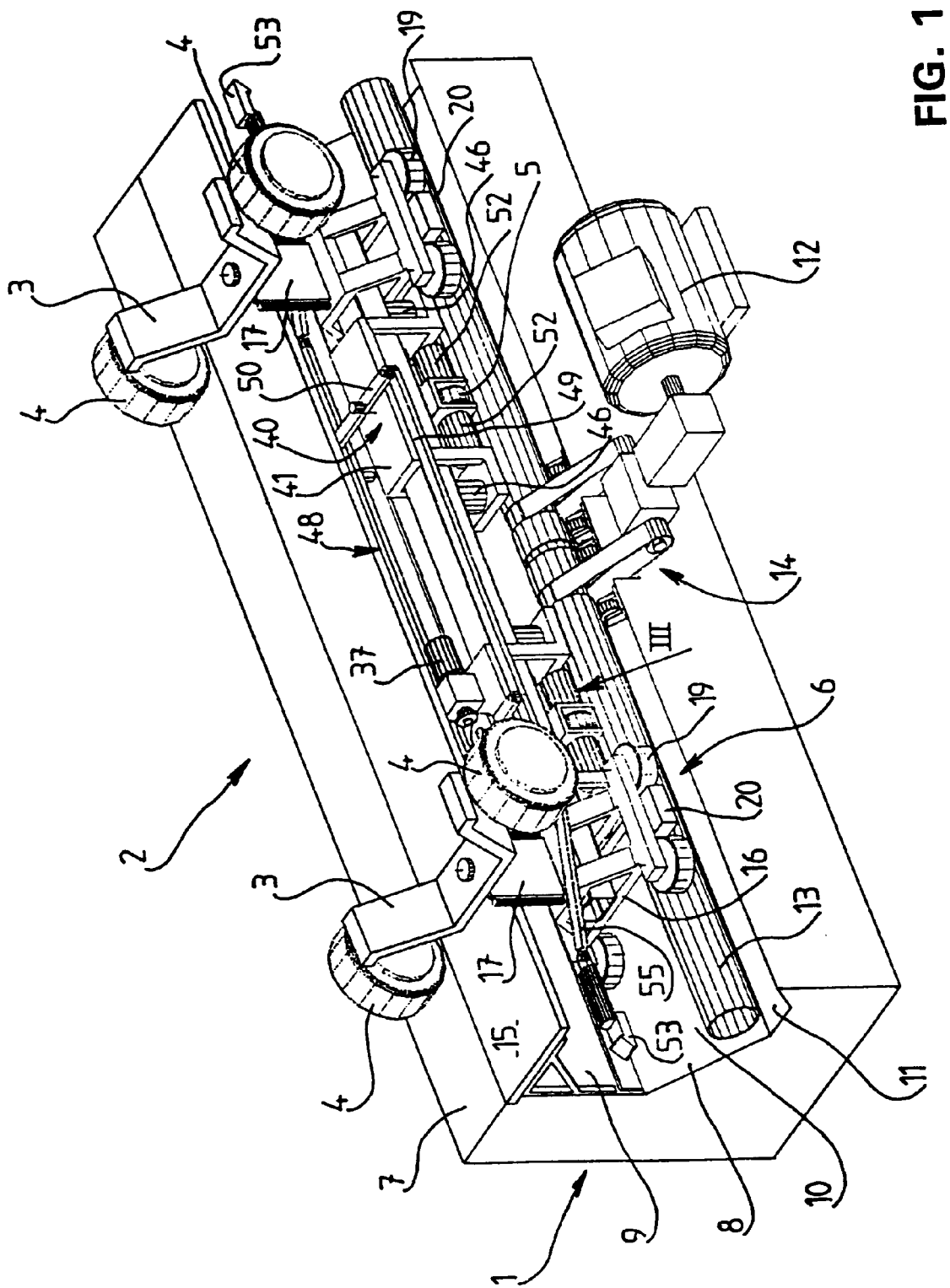
FIG. 1 is a perspective view of the system for the transport by passive vehicles according to the present invention.

FIG. 1 shows one portion of a track 1 on which is travelling a vehicle 2 in particular for the transport of passengers, of which only both bogies 3 carrying two wheels 4 and the lower portion comprising two propelling drive devices 5 and two guide devices 6 each one associated with a bogie are shown.

The track 1 comprises a trench 8 which includes two parallel side surfaces 9 located in front of each other and extending in substantially parallel relation to the axis of the track symmetrically with respect to the vertical longitudinal middle plane of the latter. Each one of the two faces is adapted to constitute a face for the guiding of the vehicles circulating on the track. The lower portion of the trench comprises two inclined faces 10 shaped as the legs of a V which join one of the vertical side faces 9 upwards and the horizontal bottom 11 of the trench downwards. The trench is covered at the level of the ground with two plates 15 leaving a slot therebetween extending along the axis of the trench. The wheels 4 are moving upon treadways 7 provided on the ground on either side of the trench.

Along the axis of the latter at some distance of the bottom 11 and of the inclined walls 10 is arranged a series of rotary tubes 13 which are axially aligned. The tubes are mounted onto conical bearings endwise so as to ensure their being held along any axes. Over the whole track they are positioned upon bearings arranged at regular intervals of 4 meters for example. By way of example the tubes are of steel with a diameter of 244 mm for a thickness of 6.3 mm. The tubes are driven in one single direction of rotation at a constant speed on the order of 800 revolutions per minute, for example. The series of tubes is divided into sections and the motors for the rotary drive of the sections have differing powers according to the nature and the length of the sections. One may, for example, provide motors for acceleration and slopes capable of rotating 80 meters of tube and motors for keeping the speed constant, capable of rotating 120 meters of tube.

The transmission of the torque may be carried out in any suitable known manner such as with the assistance of a toothed belt engaged with a motor-reducer set in relation to the characteristics of the motor. In FIG. 1, the drive motors for rotating the tube sections are not shown. A stand-by motor 12 is shown arranged between two tube sections so that it may ensure the rotation of one or the other section. Reference numeral 14 indicates a torque transmission device which is of the toothed belt type.

Figure 2:
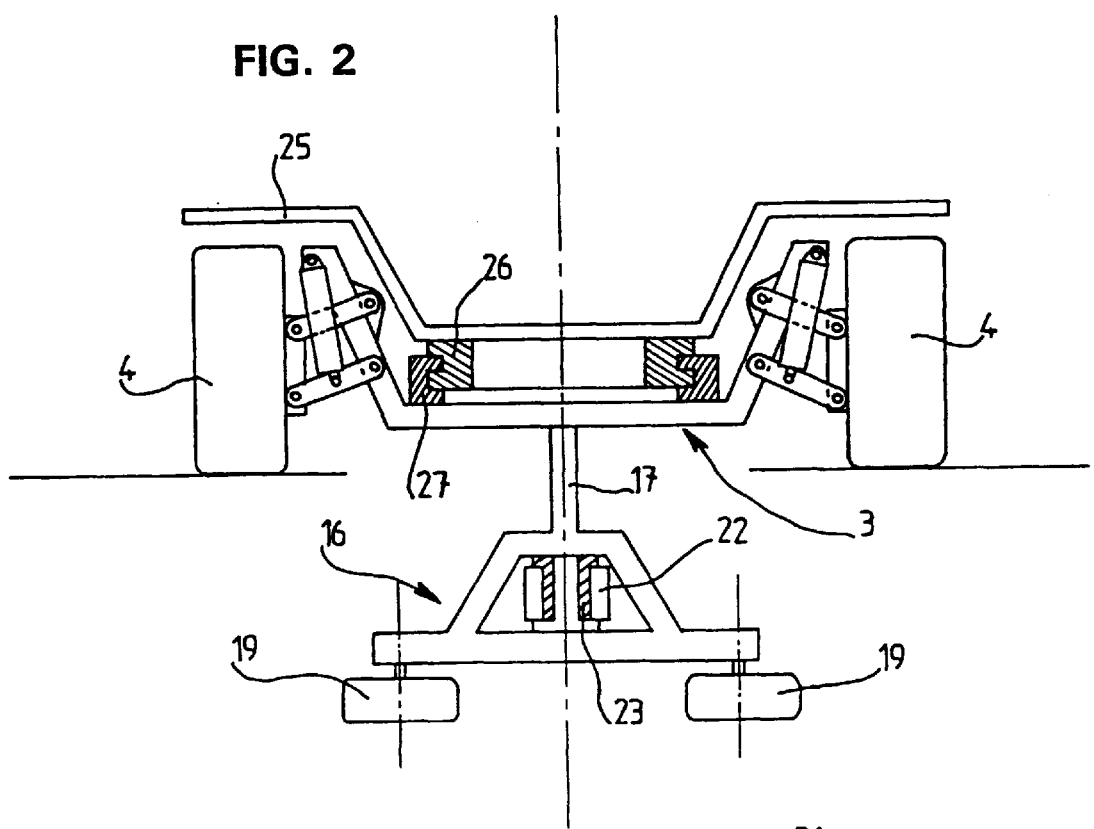
FIG. 2 is a simplified front view of the lower part of a vehicle according to the present invention.

Each guide device 6 includes a platform 16 fixedly mounted underneath a bogie 3 through a brace 17 shaped as a plate extending vertically through the slit defined between both plates 15 covering the trench 8. Being thus located inside of the trench, the platform comprises two pairs of guide rollers 19 with vertical axes of rotation, each pair being arranged so as to bear upon one of the vertical guide surfaces 9 of the track. Between both rollers 19 of each pair is arranged an emergency brake designated at 20. Both bogies of the vehicle are connected by a longitudinal beam 22 which is pivotally connected at each one of its ends at 23 to a platform 16. The beam thus extends axially within the trench 8 as shown in FIG. 2. This same figure further shows that the chassis of the vehicle identified by 25 is mounted for rotation about a vertical axis on each bogie 3 with the assistance of two rings 26, 27 made fast to the chassis and to the bogie, respectively.

Figure 3:
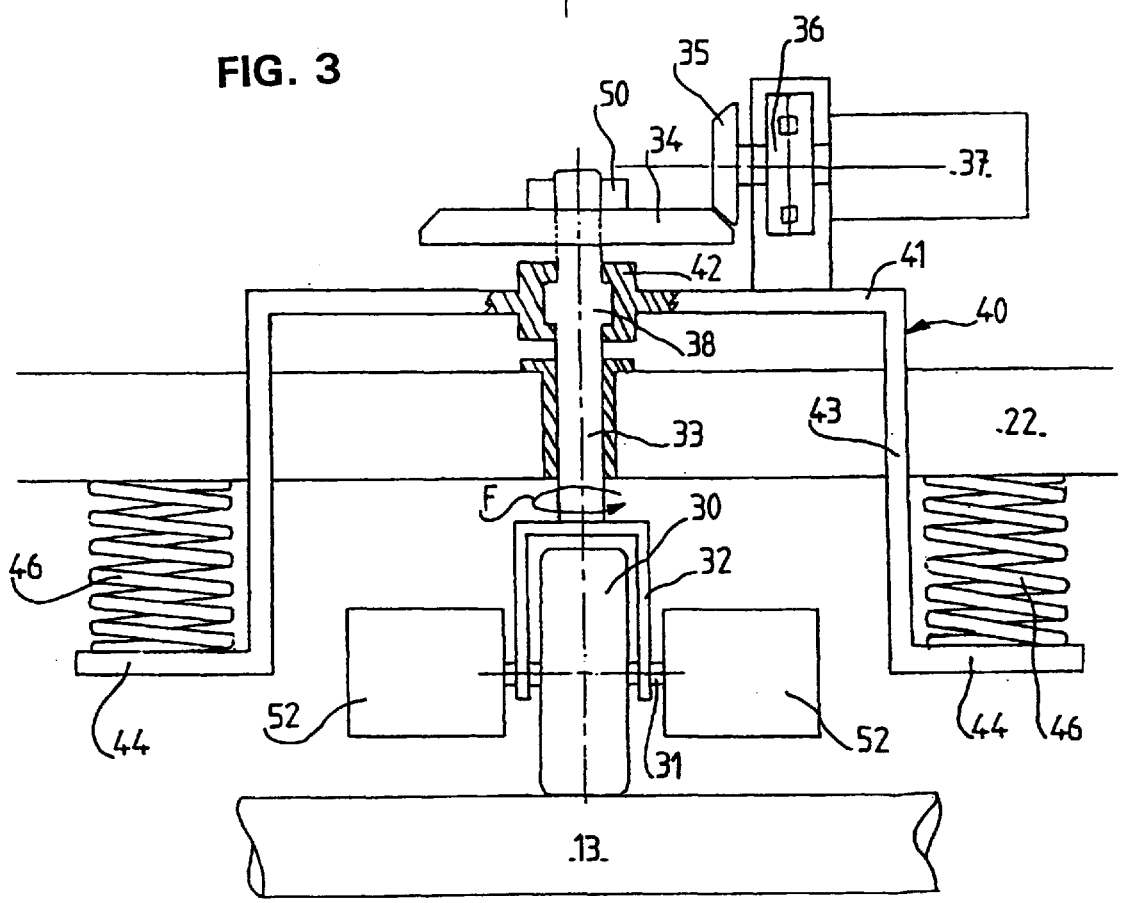
FIG. 3 is a sectional view on a larger scale with parts broken away of the detail shown at III in FIG. 1.

As clearly shown in FIGS. 1 and 3, the connecting beam 22 carries both propulsion devices 5, each one being arranged near one bogie in the axial space therebetween.

Each propulsion device 5 comprises a drive roller propelling through frictional contact 30 and having an axle 31 accommodated in a U-shaped support forming a yoke 32 directed vertically. The base of the yoke 32 is fastened to a rod 33 which is made fast at its free and to and for unitary rotation with a gear 34 meshing with a countergear 35 having a horizontal shaft made fast through a declutching device 36 to and for unitary rotation with the output shaft of an electric motor 37 in the form of a stepper motor. The rod 33 is rotatably mounted and axially retained with the assistance of a collar 38 in a support 40 mounted for being vertically displaceable on the beam 22.

The support 40 comprises a horizontal top platform 41 the central area of which is shaped as a housing portion 42 for the collar 38 of the rod 33. The platform of rectangular shape 41 carries at the level of each one of its corners a vertical brace 43. Owing to its braces, the support 40 is mounted straddlewise onto the beam 22 so as to prevent the support from any motion other than the vertical one. The mounting of the support onto the beam ensures a side guiding effect to the support. Those ends of both braces located at each longitudinal end of the support 40 carry a horizontal platform 44 which extends outwards of the support 40 along the axis of the vehicle. Between each platform 44 and the connecting beam 22 is positioned a helical spring 46 the axis of which extends vertically. This spring has the purpose of pushing the propelling roller 30 against the outer peripheral surface of the rotary drive tube 13 as shown clearly in FIG. 3.

Since the step motor is mounted onto the top platform 41 of the support 40 and the rod 33 supporting the roller 30 extends through the beam 22 so as to be freely rotatable, any rotation of the output shaft of the stepper motor 37 causes a pivoting of the roller in the direction of the arrow F and thereby a variation of the direction of the axis of rotation 31 of the roller with respect to the axis of the tube. Since the roller is pushed by the springs 46 against the tube 13, the rotation of the latter is transmitted through friction to the roller which then causes the displacement of the vehicle with a speed which depends upon the orientation of the roller with respect to the tube.

When the axis of the tube 13 and the axis 31 of the roller are parallel, the tube and the roller are rotating but generate no motion-generating reaction. As soon as another orientation is given, the resistance induced by friction causes a force which propels the vehicle. The optimum of the conversion is reached when the angle involved is from 45° to 60°. Thus the speed variations necessary for the acceleration, for the slowing down and for the braking of the vehicle are obtained by a suitable change of the angle formed between the axes of the rollers and the tube, caused by the actuation of the step motor 37.

As shown in FIG. 1, one single step motor 37 is sufficient to ensure the synchronous steering of both drive rollers 30. This effect is obtained owing to a connection between the rods 33 provided in the example shown as a parallelogram 48 comprising two links 49 which are parallel to the axis of the vehicle and connected by two connecting links 50 each one of which is secured to be made fast at its central portion to and for unitary rotation with the rod 33 steering a roller 30 in the manner illustrated in FIG. 3. Thus the rotary motion imparted to the rod 31 of one of the rollers is transmitted to the rod of the other one.

As to the structure of the vehicle, it should further be noted that dynamos 52 are mounted on the axles 31 of the rollers 30, which form part of an autonomous device for the electric power supply of the vehicle.

At each end of the vehicle is provided a device 53 for coupling the vehicle to another vehicle, which is pivotally connected to one end of a rod 55 the other end of which is pivotally connected to one vertex of the parallelogram 48.

Figure 4:
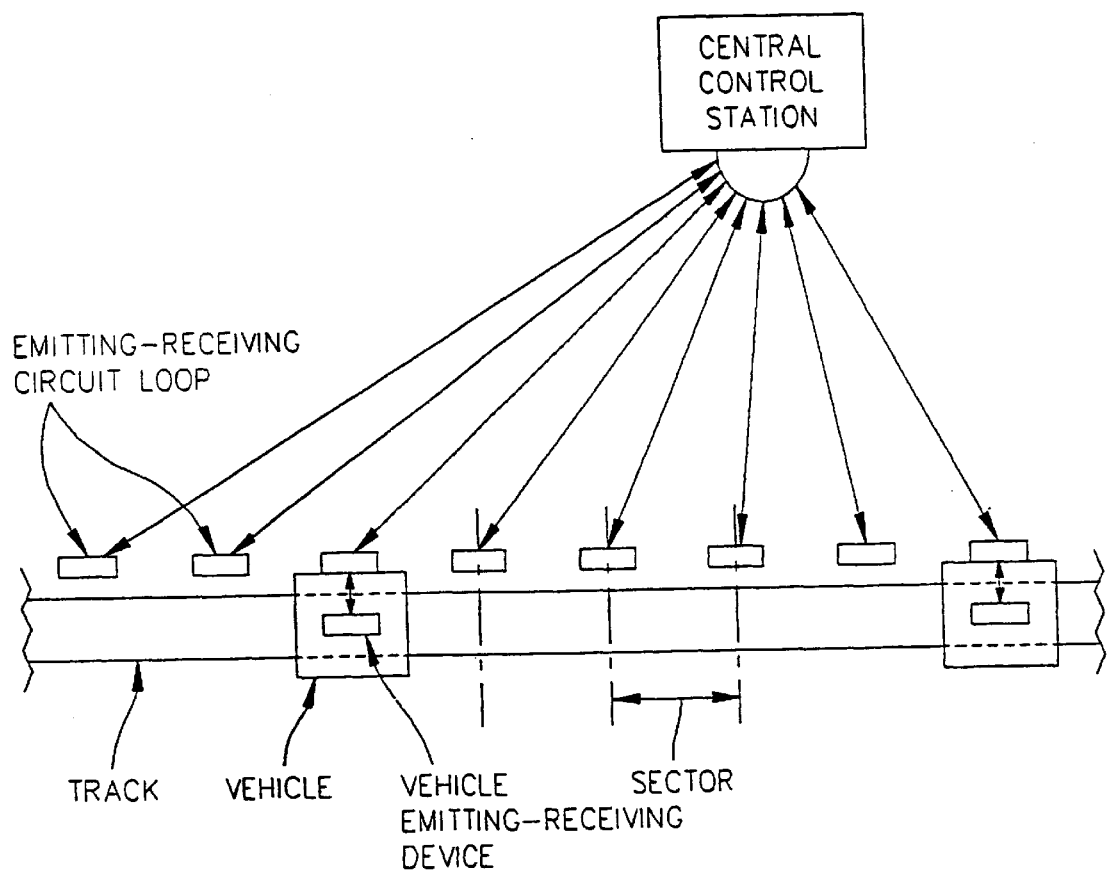
FIG. 4 is a block diagram of an automatic control system for a vehicle according to the present invention.

The control of the vehicles according to the invention is done entirely automatically. For that purpose, the system according to the invention comprises a central control station shown in FIG. 4 which manages all the vehicles. In order that this station may accomplish this task, the track is divided into sectors each one of which is fitted with a control and regulation emitting-receiving circuit loop. Each vehicle is fitted with an emitter-receiver device enabling it to dialogue with the central station through the medium of a control and regulation circuit loop. When moving past such a sector circuit loop, the vehicle transmits to the central station an identification message and the state parameters of the different components of the equipment of the vehicle. In return, the vehicle receives the speed setting for the following sector. The set value is accompanied by a variable stating the type of acceleration variation curves to be complied with as defined by the program of management of the travel. Two variation curves are stored for each sector, namely the standard acceleration and deceleration curve in particular in accordance with the topography or the geometry of the track in this sector and an emergency deceleration curve. These curves are stored in one part of the emitter-receiver device of the vehicle which constitutes the interface with the step motor. This part is designed to monitor the proper operation of the vehicle and to detect any bad transmission of data.

The circuit loops, preceding the one which has given the speed setting and is identifiable by the central station owing to the identification message from the vehicle, emit upon an order from the central station, information about a variation for example of 5 to 0 km/hour for the first circuit loop (located for example at 40 m), of 30 to 5 km/hour for the second circuit loop (located at 80 m), of 43 to 30 km/hour for the third circuit loop (located for example at 120 m), and of keeping the speed of 43 km/hour for the fourth circuit loop (located at 160 m). To further improve the safety, a safety circuit loop is provided upstream of the circuit loop moved past by the vehicle. The circuit loops which have just been stated will be counted from this safety circuit loop. Since the normal spacing between two vehicles is 200 meters in this example corresponding to 5 sectors, the slowing down settings produce their effect in case of a malfunction only. Thus the emitted information evolve in this fashion in accordance with the sensed presence of the vehicles by the management of the four circuit loops located upstream.

The collection and transmission of the information requires data concentrators distributed along the track. The track-vehicle communications are made secure by protocols for the checking of transmission of the data. The data processing system of the central station centralizes those kinematic data which are characterizing each vehicle. When moving past a circuit loop at a time t, knowing the speed and the distance to the next circuit loop, the central station calculates the travel time tp and thus establishes the anticipation of the presence of the vehicle at the time t+tp in the area of the circuit loop of the following sector.

When the vehicle passes over the next circuit loop at the anticipated time detectable by the emission of its identification message, the central station verifies the nominality of the travel of this vehicle. If on the contrary the identification message does not reach the central station at the expected times the latter concludes that there is a malfunction and starts the impaired mode of operation which will be described subsequently.

In this case, the following vehicle is put in a slow speed and mechanically couples itself to the broken-down vehicle.

The assembly of both vehicles moves at a reduced speed to the next station where all the passengers alight. Both empty vehicles are then carried at normal speed to the garage-workshop. The parallelogram ensures the positioning of the rollers of the broken down vehicle to be the same as the position of the rollers of the pushing vehicle.

In the case of a bad transmission or of an erroneous transmission of the information from the circuit loops or of the detection of an anomaly on board the vehicle, the vehicle puts itself into the safety condition providing for an emergency stop of the vehicle, an unclutching of the step motor and thereby putting the operation into the impaired mode.

It should further be noted that for safety reasons, the propelling rollers automatically return to the position perpendicular to the tubes as soon as there is no longer any action of the motor 37 provided to impart the orientation of the roller in accordance with the set data given by the system.

In the foregoing description, the control has been described for one single vehicle. Several vehicles, however, may be gathered to form a group then considered as one single vehicle by the system.

The system according to the invention of course permits the formation of grid networks.

I claim:

1. A transport system for passive vehicles comprising:
    a track comprising first and second treadways, a trench disposed between the treadways and having first and second lateral guide surfaces, and a stationary cover which covers the trench and has a slit extending in a lengthwise direction of the track;
    a plurality of rotary tubes disposed in the trench and arranged in series in the longitudinal direction of the track; and
    a vehicle comprising first and second bogies each having two main wheels, each main wheel being disposed on one of the treadways for supporting the vehicle, a drive roller contacting one of the rotary tubes and being steerable about a steering axis between a position in which an axis of rolling of the drive roller is parallel to an axis of the rotary tube which it contacts and a maximum propelling position, a pair of braces each having a first end connected to one of bogies and a second end extending through the slit of the cover into the trench, a support connected to the second end of each brace within the trench, and a pair of guide wheels rotatably mounted on each support, each guide wheel being in rolling contact with one of the guide surfaces of the track.

2. The system according to claim 1 including a step motor associated with the drive roller for steering the drive roller about its steering axis.

3. The system according to claim 1 wherein the vehicle includes a beam disposed in the trench and extending in a lengthwise direction of the vehicle and pivotably connected to the supports.

4. The system according to claim 1 wherein the drive roller is mounted for rotation in a support carrying a rod which extends perpendicular to an axis of rolling of the drive roller and is rotatably mounted in a support mounted on a beam so that the drive roller may carry out vertical motion against a biasing member adapted to push the drive roller into contact with the surface of one of the rotary tubes, the rod being adapted to be rotated by a step motor to steer the drive roller about its steering axis.

5. The system according to claim 4 wherein the vehicle includes an autonomous electric power supply comprising a dynamo connected to an axle of the drive roller.

6. The system according to claim 2 wherein the vehicle includes two steerable drive rollers, each connected to one of the bogies, and a parallelogram-shaped linkage connecting both drive rollers to the step motor.

7. The system according to claim 1 wherein the cover is flush with the treadways.

8. The system according to claim 1 wherein the trench is recessed with respect to a ground surface.

9. A transport system for passive vehicles comprising:
    a track comprising first and second treadways and first and second lateral guide surfaces extending in a lengthwise direction of the track between the treadways;
    a plurality of rotary tubes arranged in series in the longitudinal direction of the track;
    a plurality of vehicles each having main wheels disposed on the treadways for supporting the vehicle, a drive roller contacting one of the rotary tubes and steerable about a steering axis between a position in which an axis of rolling of the drive roller is parallel to an axis of the rotary tube which it contacts and a maximum propelling position, and a plurality of guide wheels, each guide wheel being in rolling contact with one of the guide surfaces of the track; and
    a central control station adapted to dialogue with an emitter-receiver device on board each vehicle,
    wherein the track is divided into track sectors to each of which is assigned a set speed in accordance with a topography of the track sector, and each track sector comprises an emitting-receiving control and regulation circuit loop connected to the central control station to ensure dialogue with the emitter-receiver devices of the vehicles.

10. The system according to claim 9 wherein the central control station is adapted to calculate the time at which each vehicle should pass over each track sector and to compare the calculated time of passage to an actual time of passage indicated by the emitter-receiver device of the vehicle.

11. A transport system for passive vehicles comprising:
    a track divided into a plurality of track sectors and comprising first and second treadways and first and second lateral guide surfaces extending in a lengthwise direction of the track;
    a plurality of rotary tubes arranged in series in the longitudinal direction of the track; and
    a plurality of vehicles each having main wheels disposed on the treadways, a drive roller contacting one of the rotary tubes and steerable about a steering axis between a position in which an axis of rolling of the drive roller is parallel to an axis of the rotary tube which it contacts and a maximum propelling position, and a plurality of guide wheels, each guide wheel being in rolling contact with one of the guide surfaces of the track, wherein each vehicle is adapted to receive a speed setting for a successive track sector and a variable indicating a type of acceleration variation curve to be complied with, and wherein for each track sector, a standard acceleration and deceleration curve corresponding to one of a topography and geometry of the track sector in which the vehicle is located and an emergency deceleration curve are stored in an emitter-receiver device of the vehicle.

12. The system according to claim 11 wherein in case of an abnormality in a first one of the vehicles, the first vehicle puts itself into a safety condition ensuring an emergency stop of the first vehicle and operation in an impaired mode is provided for a second succeeding vehicle on the track, providing coupling of the second vehicle to the first vehicle which underwent the abnormality and common displacement of both vehicles at a reduced speed to a next normal stop station.

13. A transport system for passive vehicles comprising:

a track comprising first and second treadways and first and second lateral guide surfaces extending in a lengthwise direction of the track;

a plurality of rotary tubes arranged in series in the longitudinal direction of the track; and a plurality of vehicles each having main wheels disposed on the treadways, a drive roller contacting one of the rotary tubes and steerable about a steering axis between a position in which an axis of rolling of the drive roller is parallel to an axis of the rotary tube which it contacts and a maximum propelling position, a motor associated with the drive roller for steering the drive roller about its steering axis, and a plurality of guide wheels, each guide wheel being in rolling contact with one of the guide surfaces of the track, the drive roller being adapted to return automatically to the position in which its axis of rolling is parallel to the axis of the rotary tube which it contacts upon a stop of operation of the motor.

* * * * *